US008605154B2

United States Patent
Datta et al.

(10) Patent No.: US 8,605,154 B2
(45) Date of Patent: Dec. 10, 2013

(54) VEHICLE HEADLIGHT MANAGEMENT

(75) Inventors: Ankur Datta, White Plains, NY (US);
Charles A. Otto, Lansing, MI (US);
Sharathchandra U. Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 13/071,768

(22) Filed: Mar. 25, 2011

(65) Prior Publication Data
US 2012/0242832 A1   Sep. 27, 2012

(51) Int. Cl.
*H04N 7/18*   (2006.01)
*H04N 5/33*   (2006.01)
*F21V 23/04*   (2006.01)

(52) U.S. Cl.
USPC .......................... 348/148; 348/366; 362/276

(58) Field of Classification Search
USPC ................................ 348/148, 366; 362/276
See application file for complete search history.

(56) References Cited

U.S. PATENT DOCUMENTS

| 7,004,606 | B2 | 2/2006 | Schofield | |
|---|---|---|---|---|
| 2002/0080618 | A1* | 6/2002 | Kobayashi et al. | 362/466 |
| 2004/0143380 | A1 | 7/2004 | Stam et al. | |
| 2006/0267502 | A1 | 11/2006 | Kubota et al. | |
| 2007/0221822 | A1* | 9/2007 | Stein et al. | 250/205 |
| 2008/0294315 | A1 | 11/2008 | Breed | |
| 2009/0010494 | A1* | 1/2009 | Bechtel et al. | 382/104 |
| 2010/0265330 | A1 | 10/2010 | Li et al. | |

* cited by examiner

*Primary Examiner* — David Czekaj
*Assistant Examiner* — Tsion B Owens
(74) *Attorney, Agent, or Firm* — Matthew H. Chung; Yee And Associates, PC

(57) ABSTRACT

A method, data processing system, and computer program product for managing a headlight on a vehicle are presented. An image of an area in front of the vehicle is received. A first set of features is identified in the received image. The first set of features in the received image is compared with a number of sets of features from a plurality of previous images. Each image in the plurality of previous images is associated with a headlight setting. A second set of features from a previous image in the plurality of previous images matching the first set of features in the received image is identified. A determination is made whether to change a setting for the headlight on the vehicle based on the headlight setting associated with the previous image.

23 Claims, 9 Drawing Sheets

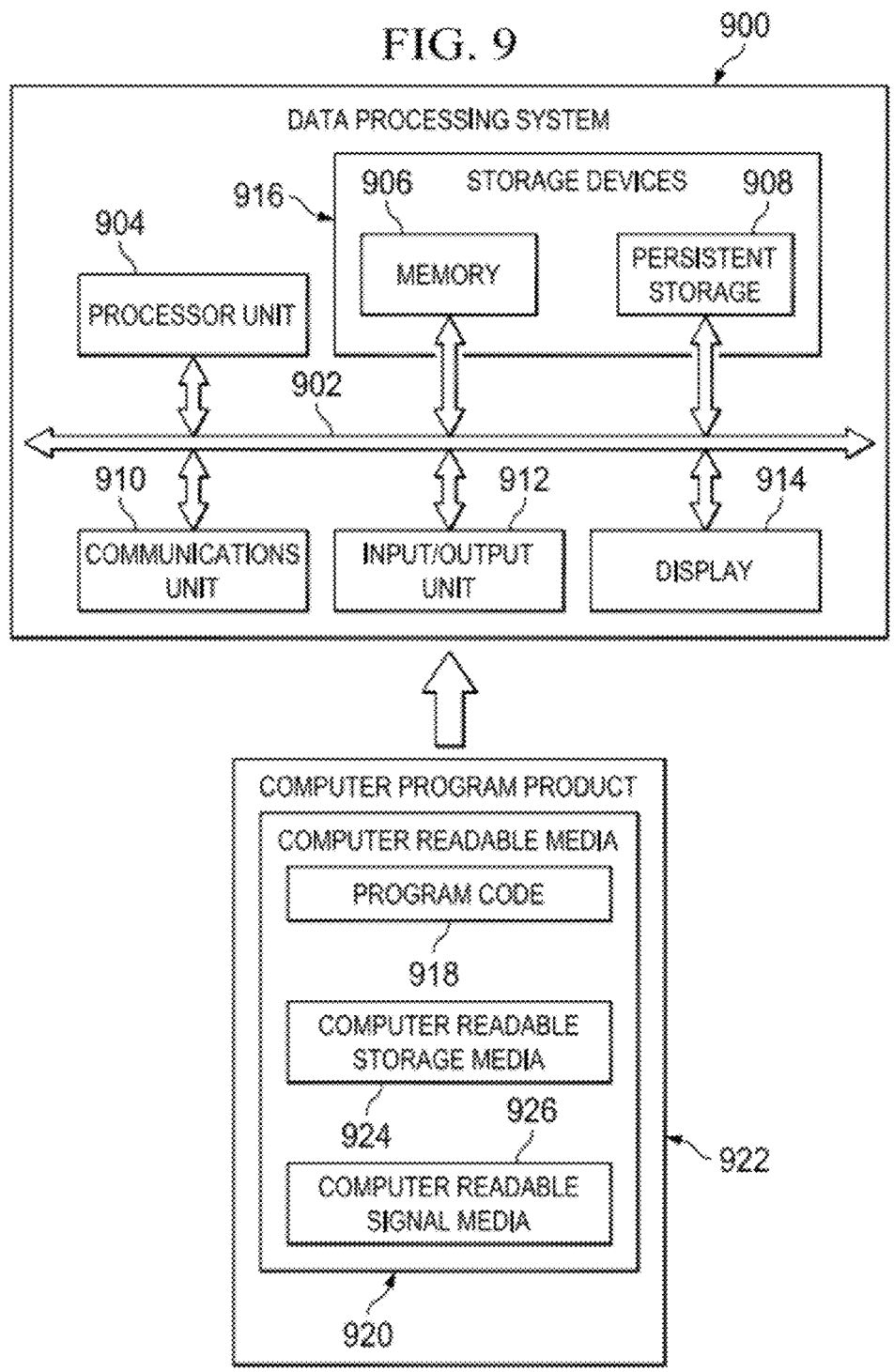

VEHICLE HEADLIGHT MANAGEMENT

BACKGROUND

1. Field

The disclosure relates generally to lighting systems for vehicles and more specifically to management of headlights for vehicles. Still more particularly, the present disclosure relates to controlling headlight settings on a vehicle.

2. Description of the Related Art

Vehicles have headlights for illuminating areas in front of the vehicle. The headlights often have different settings for different situations. Drivers of vehicles can manually switch between settings. For example, a driver may select a low beam setting in an urban area. The driver may change the headlight setting to a high beam setting in a rural area.

Improper selection of a headlight setting can cause issues. For example, a high beam setting may cause glare for other vehicles on the road. On the other hand, a low beam setting may not properly illuminate dark areas. As a result, regulations may begin to mandate locations and conditions where certain settings may not be used.

Accordingly, it would be advantageous to have a method and apparatus, which takes into account one or more of the issues discussed above as well as possibly other issues.

SUMMARY

The different illustrative embodiments provide a method, data processing system, and computer program product for managing a headlight on a vehicle. An image of an area in front of the vehicle is received. A first set of features is identified in the received image. The first set of features in the received image is compared with a number of sets of features from a plurality of previous images. Each image in the plurality of previous images is associated with a headlight setting. A second set of features from a previous image in the plurality of previous images matching the first set of features in the received image is identified. A determination is made whether to change a setting for the headlight on the vehicle based on the headlight setting associated with the previous image.

BRIEF DESCRIPTION OF THE SEVERAL VIEWS OF THE DRAWINGS

FIG. 9 is an illustration of a data processing system in accordance with an illustrative embodiment.

DETAILED DESCRIPTION

Figure 1:
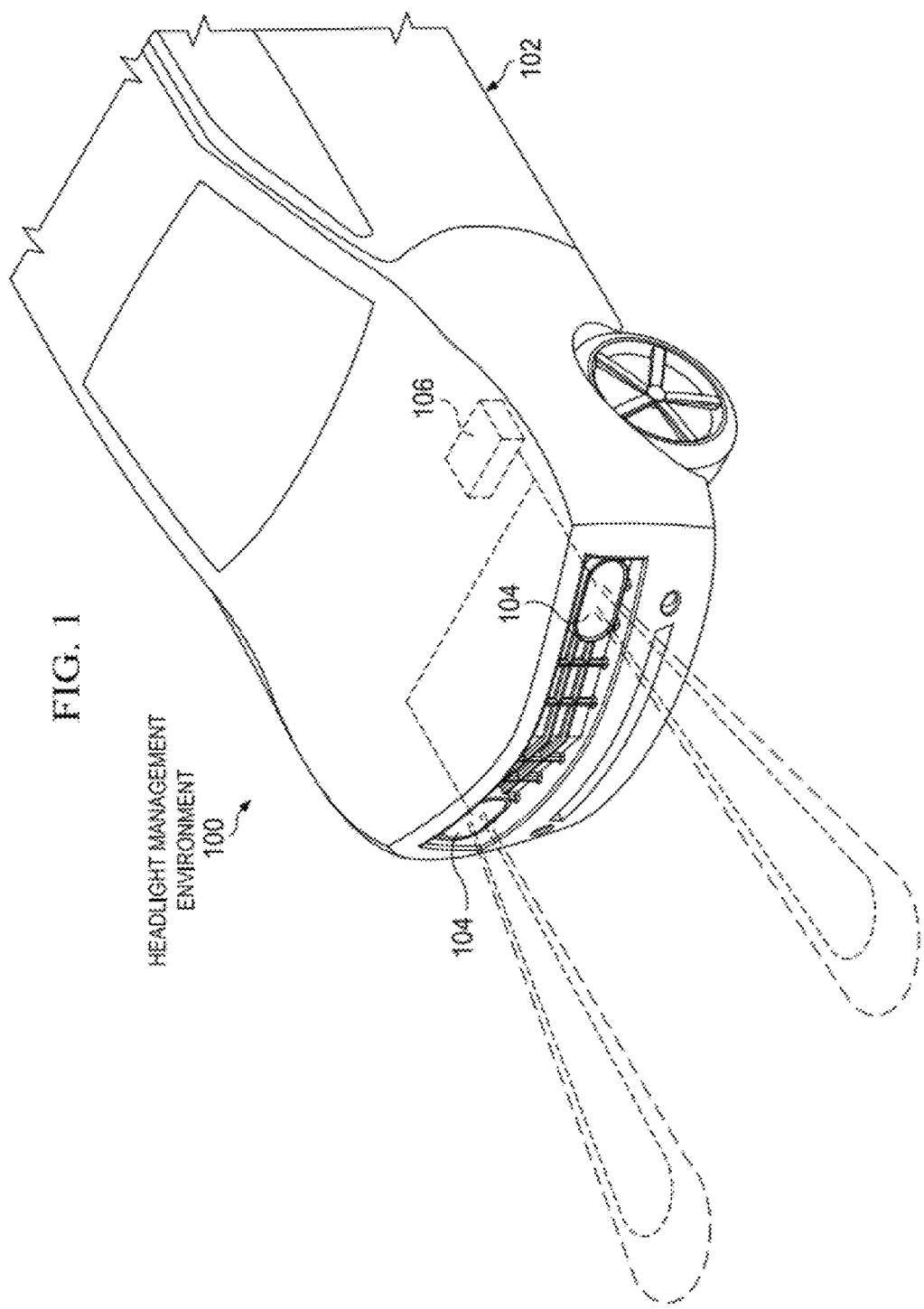
FIG. 1 is an illustration of a vehicle in a headlight management environment in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The different illustrative embodiments recognize and take into account a number of different considerations. For example, the different illustrative embodiments recognize and take into account that manually changing headlight settings may be undesirable in some cases. Drivers may not want to monitor the headlight setting of their vehicle. As a result, drivers may use a low beam setting when a high beam setting would provide better illumination of the area in front of their vehicle. In other examples, drivers may forget to change from a high beam setting to a low beam setting when approaching other vehicles. As a result, drivers of the other vehicles may experience glare from the headlights of the first vehicle.

The different illustrative embodiments recognize that one solution may involve identifying sources of light in areas in front of the vehicle. The sources of light may be identified as different objects. For example, one source of light may be identified as a street lamp while another source of light may be identified as headlights of an approaching vehicle. Based on the identification of each source of light, a decision may be made whether to change a setting of the headlights.

However, the different illustrative embodiments recognize and take into account that individually identifying each source of light in front of the vehicle may be time consuming. The decision whether to change the headlight setting may need to occur quickly. By the time each source of light is identified, the decision may be based on information that is no longer relevant.

Additionally, the different illustrative embodiments recognize and take into account that just one misidentification of a source of light in front of the vehicle may result in a decision that is incorrect. For example, a source of light may be misidentified as a street light when it is actually an approaching vehicle. This misidentification may result in the use of a high beam setting when a low beam setting is appropriate. In another example, taillights of another vehicle in front of the vehicle may be misidentified as ambient light because taillights are often not as bright as headlights. This misidentification may also result in the use of a high beam setting when a low beam setting is appropriate.

Thus, the different illustrative embodiments provide a method, data processing system, and computer program product for managing a headlight on a vehicle. An image of an area in front of the vehicle is received. A first set of features is identified in the received image. The first set of features in the received image is compared with a number of sets of features from a plurality of previous images. Each image in the plurality of previous images is associated with a headlight setting. A second set of features from a previous image in the plurality of previous images matching the first set of features in the received image is identified. A determination is made whether to change a setting for the headlight on the vehicle based on the headlight setting associated with the previous image.

A "number", as used herein with reference to an item, means one or more items. A "set", as used herein with reference to an item, means one or more items. Also as used herein, a first item may considered to be associated with a second item by being linked with the second component, joined with the second component, combined with the second component, and/or connected with the second component in some other suitable manner. The first component also may be connected to the second component through using a third component. The first component may also be considered to be associated with the second component by being formed as part of and/or an extension of the second component.

With reference now to FIG. 1, an illustration of a vehicle in a headlight management environment is depicted in accordance with an illustrative embodiment. Headlight management environment 100 is an environment in which illustrative embodiments may be implemented. Headlight management environment 100 includes vehicle 102. Vehicle 102 has headlights 104 which are controlled in headlight management environment 100.

In this illustrative embodiment, vehicle 102 includes headlight management system 106. Headlight management system controls headlights 104 in vehicle 102. Headlight management system 106 determines a setting for headlights 104. Headlight management system 106 determines the setting based on conditions occurring in headlight management environment 100. Headlight management system 106 is connected to headlights 104. Headlight management system 106 may change a setting of headlights 104.

A first component may be considered to be connected to a second component by being secured to the second component, bonded to the second component, fastened to the second component, and/or joined to the second component in some other suitable manner. The first component also may be connected to the second component through using a third component. The first component may also be considered to be associated with the second component by being formed as part of and/or an extension of the second component.

While, vehicle 102 is illustrated as a car, illustrative embodiments may be implemented in any type of vehicle. A "vehicle", as used herein, is any movable object that uses headlights. In another example, a vehicle is an object that uses headlights and has a propulsion system. For example, without limitation, vehicle 102 may be a car, a truck, a van, a bus, a motorcycle, a bicycle, a boat, an airplane, a train and/or any other vehicle that uses headlights.

Figure 2:
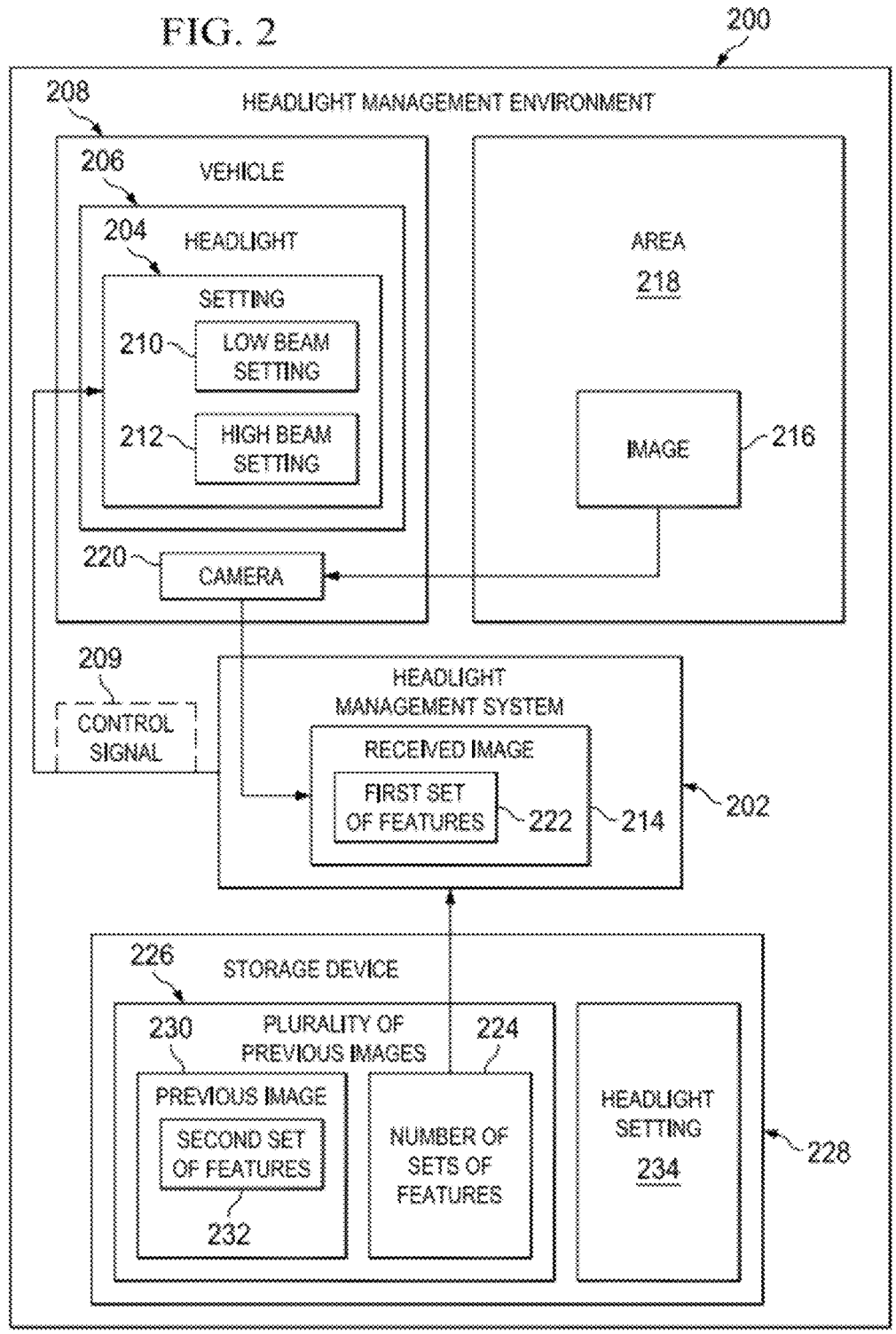
FIG. 2 is an illustration of a block diagram of a headlight management environment in accordance with an illustrative embodiment.

With reference now to FIG. 2, an illustration of a block diagram of a headlight management environment is depicted in accordance with an illustrative embodiment. Headlight management environment 100 in FIG. 1 is an example of one implementation of headlight management environment 200.

In these illustrative examples, headlight management system 202 manages setting 204 of headlight 206 on vehicle 208. Headlight management system 202 may be implemented in hardware, software, or a combination of the two. For example, headlight management system 202 may send a control signal 209 to headlight 206 to change setting 204 from low beam setting 210 to high beam setting 212.

In these examples, low beam setting 210 is a setting where an amount of light emitting from headlight 206 in an upward direction is reduced. Low beam setting 210 may also include a reduction of light in a direction of oncoming traffic relative to vehicle 208. Low beam setting 210 is intended to reduce an amount of light in the eyes of drivers of vehicles near vehicle 208. High beam setting 212 is a setting where the direction of the distribution of light has not been reduced. High beam setting 212 is designed to provide greater illumination of objects in front of vehicle 208 than low bean setting 210.

In these depicted examples, headlight management system 202 can change setting 204 in a number of ways. For example, headlight 206 may include two light sources, one light source for high beam setting 212 and another light source for low beam setting 210. The light sources may be separate lamps, bulbs, light emitting diodes, filaments, or any other suitable source of light. Headlight management system 202 can change setting 204 by turning one light source on, while turning off the other light source.

In other examples, headlight management system 202 can change setting 204 by reducing an amount of light produced by headlight 206. In yet other examples, headlight management system 202 can change setting 204 by causing a direction headlight 206 points to be changed. Headlight management system 202 can also cause a shield to be placed over headlight 206 to reduce an amount of light emitting from headlight 206 in an upward direction.

In these illustrative examples, headlight management system 202 can change setting 204 using currently available headlights and control systems for headlights. Control signal 209 is an example of a control signal that is used in current headlight systems. For example, headlight management system 202 may just select when to send control signal 209.

Headlight management system 202 manages setting 204 based on received image 214. Received image 214 is image 216 of area 218 in front of vehicle 208. Image 216 is generated by camera 220 located on vehicle 208. For example, camera 220 is positioned on the front of vehicle 208 and captures images of objects in front of vehicle 208. In these examples, camera 220 located on vehicle 208 by being inside of vehicle 208 or outside vehicle 208.

Headlight management system 202 identifies first set of features 222 in received image 214. In these illustrative examples, first set of features 222 includes information about light within received image 214. The information in first set of features 222 includes any values about light within received image 214 that can be measured. First set of features 222 may include, for example, at least one of an amount of light at points within received image 214, colors of lights at points within received image 214, distances between sources of light within received image 214, sizes of sources of light within received image 214, and any other values of measurement of light that can be identified in received image 214.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

Headlight management system 202 compares first set of features 222 with number of sets of features 224. Number of sets of features 224 is sets of features identified in plurality of previous images 226. Number of sets of features 224 includes similar information as first set of features 222. Plurality of previous images 226 includes images that were generated by cameras of other vehicles. For example, plurality of previous images 226 includes images from areas in front of vehicles that have traveled through areas.

Plurality of previous images 226 is stored in storage device 228. Headlight management system 202 accesses storage device 228 to compare first set of features 222 with number of sets of features 224. For example, headlight management system 202 and storage device 228 may be located on vehicle 208. Headlight management system 202 may access storage device 228 via a wired connection. In other embodiments, storage device 228 may be located remotely from headlight management system 202. Headlight management system 202 may access storage device 228 via a wireless connection.

Headlight management system 202 searches number of sets of features 224 to identify second set of features 232. Second set of features 232 is a set of features from previous image 230. Second set of features 232 is similar to first set of features 222. For example, second set of features 232 may include amounts of light at points in previous image 230. In another example, second set of features 232 may include colors of lights at points in previous image 230.

Headlight management system 202 identifies headlight setting 234 associated with previous image 230. Headlight setting 234 is a setting of the headlights of a vehicle that previous image 230 was generated from. Headlight setting 234 is the setting of the headlights at the time previous image 230 was generated.

Headlight management system 202 compares headlight setting 234 with setting 204. If headlight setting 234 is different than setting 204, headlight management system 202 may change setting 204. For example, headlight setting 234 could indicate that at the time previous image 230 was generated, a high beam setting was being used. If setting 204 is low beam setting 210 then headlight management system 202 may change setting 204 from low beam setting 210 to high beam setting 212. However, if setting 204 is high beam setting 212, then headlight management system 202 will not change setting 204.

The illustration of headlight management environment 200 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, other settings may be used in addition to setting 204 and headlight setting 234. For example, headlight setting 234 may indicate that a daytime running lamp, a fog lamp, or a driving lamp was used. Headlight management system 202 may change setting 204 to match any type of setting.

In other illustrative embodiments, headlight management system 202 may be located remotely from vehicle 208. Headlight management system 202 may receive received image 214 and control setting 204 using wired or wireless connections. In yet other examples, camera 220 may not be located on vehicle 208. For example, camera 220 may be located along a street that vehicle 208 is traveling. Upon detecting vehicle 208, camera 220 generates image 216 for headlight management system 202. Then headlight management system 202 can determine an appropriate setting for headlight 206 using image 216 and send a control signal to vehicle 208.

Figure 3:
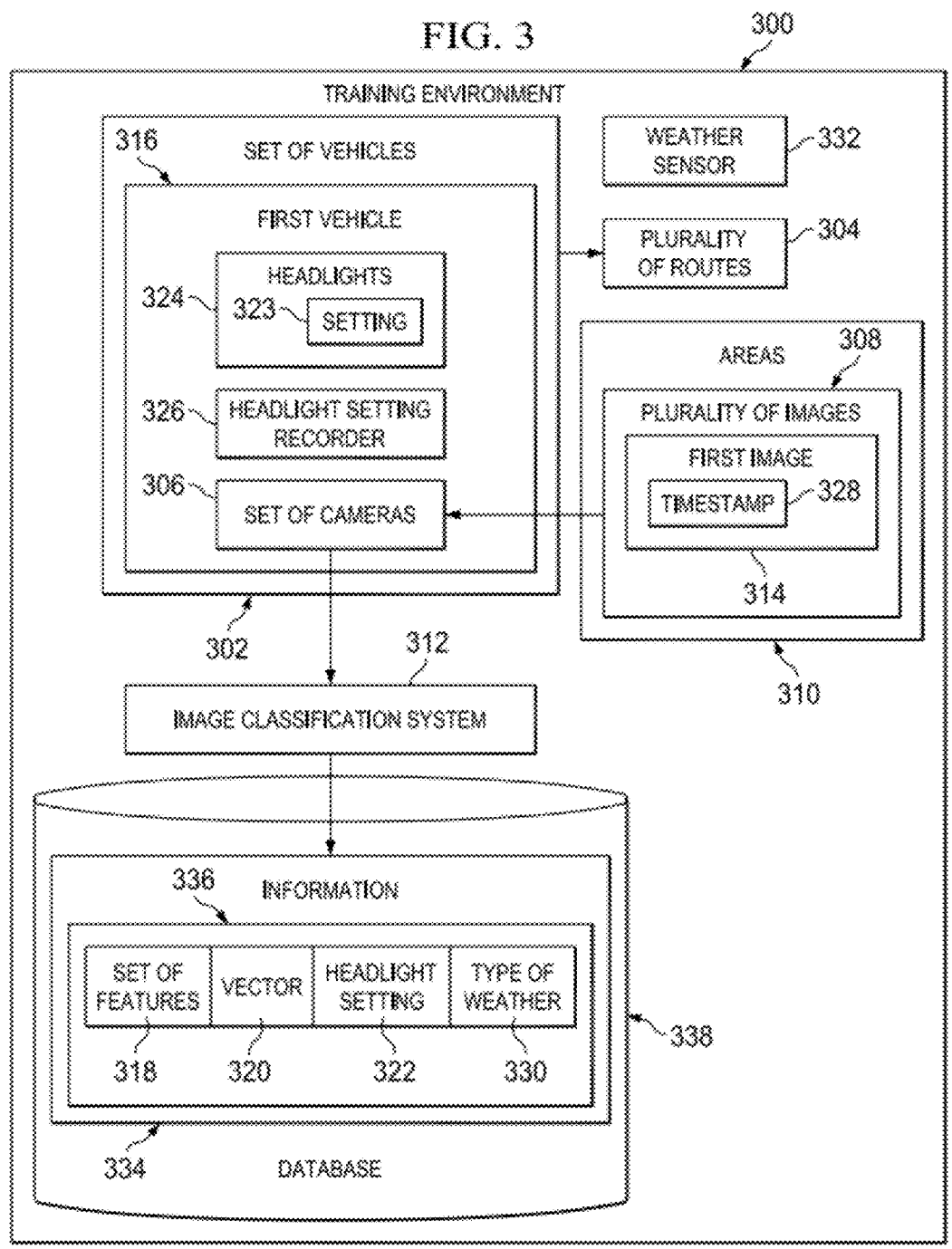
FIG. 3 is an illustration of a block diagram of a training environment in accordance with an illustrative embodiment.

With reference now to FIG. 3, an illustration of a block diagram of a training environment is depicted in accordance with an illustrative embodiment. Training environment 300 is an environment in which plurality of previous images 226 may be obtained for use in determining whether to change setting 204 of headlight 206 in FIG. 2.

In training environment 300, set of vehicles 302 travels on plurality of routes 304. While set of vehicles 302 travels, set of cameras 306 generates plurality of images 308. Plurality of images 308 includes images of areas 310 in front of set of vehicles 302. Areas 310 are along plurality of routes 304. An administrator may select plurality of routes 304 to obtain a variety of images from a variety of scenarios. For example, plurality of routes 304 can include routes through urban areas and rural areas. Plurality of routes 304 may occur at different times and during different types of weather. For example, plurality of routes 304 may include routes at night, during the daytime, at dusk, and at dawn. Plurality of routes 304 may occur during times of sunlight, rain, snow, sleet, hail, fog, and/or cloudiness.

In these illustrative examples, plurality of images 308 is processed by image classification system 312. For example, image classification system 312 receives first image 314 of an area in front of first vehicle 316. Image classification system 312 identifies set of features 318 in first image 314. Set of features 318 includes information about light within first image 314, such as discussed above with regard to first set of features 222 in FIG. 2. Image classification system 312 generates vector 320 from set of features 318. Vector 320 is an n dimensional vector including values from set of features 318. For example, vector 320 may include values for light at a plurality of points in first image 314. Each of the values can be included as a dimension in the n number of dimensions.

Image classification system 312 also identifies headlight setting 322. Headlight setting 322 is setting 323 of headlights 324 at a time first image 314 was generated, such as headlight setting 234 in FIG. 2. In these examples, headlights 324 are operated by a driver of first vehicle 316. As the driver travels on plurality of routes 304, the driver's selections of setting 323 for headlights 324 are recorded. A headlight setting at a time each image in plurality of images 308 was generated is recorded and associated with the respective image. For example, headlight setting recorder 326 records setting 323 of headlights 324 and each time the driver changes setting 323. Image classification system 312 receives information about setting 323 and each time setting 323 was changed. Camera includes timestamp 328 in first image 314. Timestamp 328 indicates the time first image 314 was generated. Image classification system 312 can identify setting 323 from timestamp 328 and the information about setting 323.

Image classification system 312 also identifies type of weather 330 occurring at the time first image 314 was generated. For example, image classification system 312 may obtain weather reports for weather conditions at a location of the first vehicle at the time of timestamp 328. In another example, first vehicle 316 may include weather sensor 332. Weather sensor 332 identifies weather conditions occurring outside first vehicle 316. For example, weather sensor 332 may include an ambient light sensor, a thermometer, a rain gauge, a barometer, an anemometer, a hygrometer, and/or any other suitable devices for identifying weather conditions.

Image classification system 312 stores information 334 about first image 314 as entry 336 in database 338. Information 334 can include set of features 318, vector 320 headlight setting 322, type of weather 330, as well as first image 314. Image classification system 312 processes each image in plurality of images 308. Image classification system 312 stores information about each image in plurality of images 308 as an entry in database 338.

Figure 4:
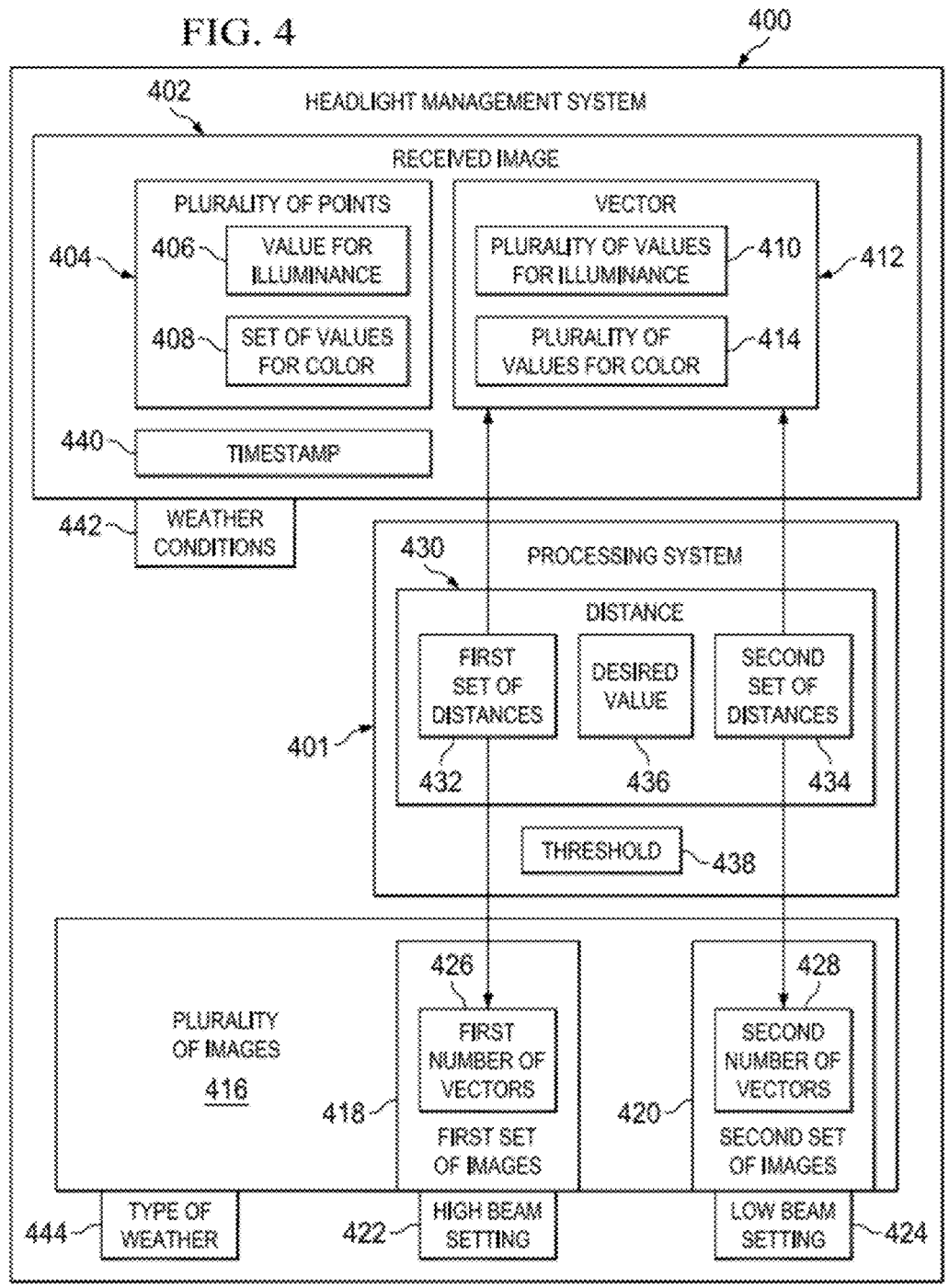
FIG. 4 is an illustration of a block diagram of a headlight management system in accordance with an illustrative embodiment.

With reference now to FIG. 4, an illustration of a block diagram of a headlight management system is depicted in accordance with an illustrative embodiment. Headlight management system 400 is an example of one implementation of headlight management system 202 in FIG. 2. Portions of headlight management system 400 may be implemented in a vehicle, such as vehicle 102 in FIG. 1.

Processing system 401 in headlight management system 400 processes received image 402. Processing system 401 identifies plurality of points 404 in received image 402. For example, processing system 401 identifies a number of pixels in received image 402. Processing system 401 groups one or more number of pixels together to form plurality of points 404. At each of plurality of points 404, processing system 401 identifies value for illuminance 406. Illuminance is the total luminous flux incident on a surface, per unit of area. Luminous flux is the measure of the perceived power of light.

If received image 402 is in color, processing system 401 may also identify set of values for color 408 at each point in plurality of points 404. For example, processing system 401 may identify a value for an amount of red, green, and blue as set of values for color 408 at each point in plurality of points 404.

Processing system 401 includes plurality of values for illuminance 410 in vector 412 for received image 402. Processing system 401 obtains plurality of values for illuminance 410 from value for illuminance 406 at multiple points in plurality of points 404. Vector 412 is an n dimensional vector, such as discussed above in regard to vector 320 in FIG. 3. Processing system 401 may also include plurality of values for color 414 in vector 412. Processing system 401 obtains plurality of values for color 414 from set of values for color 408 at multiple points in plurality of points 404.

Processing system 401 identifies plurality of images 416. Plurality of images 416 is an example of plurality of images 308 in FIG. 3. Plurality of images 416 includes first set of images 418 and second set of images 420. First set of images 418 is one or more images from plurality of images 416 that are associated with high beam setting 422. Second set of images 420 is one or more images from plurality of images 416 that are associated with low beam setting 424. Each image in first set of images 418 is associated with a vector in first number of vectors 426. Each image in second set of images 420 is associated with a vector in second number of vectors 428.

Processing system 401 compares features in received image 402 with features in images in plurality of images 416 by computing distance 430. Distance 430 is a calculation of an amount of distance between two vectors. Distance 430 can be calculated using a radial basis function (RBF), such as the one provided below:

$$k(x_i, x_j) = \exp(-\gamma \|x_i - x_j\|^2)$$

where $x_i$ and $x_j$ are the two vectors and gamma ($\gamma$) is a constant selected to control the amplification of the difference between $x_i$ and $x_j$.

In these illustrative examples, processing system 401 calculates first set of distances 432 between vector 412 and one or more vectors in first number of vectors 426. Processing system 401 also calculates second set of distances 434 between vector 412 and one or more vectors in second number of vectors 428. Processing system 401 uses first set of distances 432 and second set of distances 434 to determine whether received image 402 is closer to images associated with high beam setting 422 or low beam setting 424. For example, if values for one or more distances in first set of distances 432 are lower than values for distances in second set of distances 434, processing system 401 will determine that received image 402 is closer to first set of images 418 associated with high beam setting 422.

Processing system 401 uses the setting associated with vectors for images in plurality of images 416 having desired value 436 for distance 430 in determining whether to change a setting for a headlight of a vehicle, such as vehicle 102 in FIG. 1. For example, processing system 401 may use the setting associated with the vector having the lowest calculated value for distance 430. In other examples, desired value 436 may be a threshold value. If none of the vectors in either of first number of vectors 426 and second number of vectors 428 have distance 430 lower than desired value 436, then processing system 401 may not use results obtained using vector 412. Rather, processing system 401 may wait until a vector in a new received image has desired value 436 for distance 430.

Processing system 401 may also determine whether an amount of time since the image was generated and a time desired value 436 for distance 430 is obtained passed threshold 438. For example, received image 402 includes timestamp 440. Processing system 401 can compare the time indicated in timestamp 440 with a current time. If the difference between timestamp 440 and the current time exceeds threshold 438, processing system 401 may not use results obtained using vector 412. For example, if too much time since received image 402 was generated has elapsed, the information in received image 402 may no longer be reliable in determining whether to change a setting of a headlight.

Processing system 401 also takes weather conditions 442 into account. Processing system 401 obtains weather conditions 442 at a time received image 402 was generated. For example, processing system 401 may obtain weather conditions 442 as described above with regard to type of weather 330 in FIG. 3. Processing system 401 compares weather conditions 442 with type of weather 444 associated with plurality of images 416. If there is a difference in weather between weather conditions 442 and type of weather 444, processing system 401 can modify vector 412 to account for the difference in weather. For example, weather conditions 442 may include snow while type of weather 444 does not. Under these conditions, processing system 401 may reduce values in plurality of values for illuminance 410 to account for increased brightness associated with snowy conditions. In another example, rain often makes conditions darker. If the difference in weather is because of rain, processing system 401 may modify values in plurality of values for illuminance 410 to account for the darker conditions. In yet other examples, if weather conditions 442 indicate that fog is present, processing system 401 may conclude that high beam setting 422 is inappropriate. Processing system 401 may default to a fog lamp setting when weather conditions 442 indicate that fog is present.

In these illustrative examples, processing system 401 includes both hardware and software components. For example, in some illustrative embodiments, processing system 401 identifies features in received image 402, and compares features in received image 402 with features in images in plurality of images 416 using only hardware components. In other illustrative embodiments, certain functions of processing system 401 may be performed by software components operating in a data processing system while other functions of processing system 401 are performed by hardware components. In yet other illustrative embodiments, all of the functions of processing system 401 may be performed by software components operating in a data processing system.

The illustration of training environment 300 in FIG. 3 and headlight management system 400 in FIG. 4 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments plurality of images 308 may be stored in database 338. In other embodiments, plurality of images 308 may be deleted to preserve storage space in database 338 once image classification system 312 has obtained information 334 from plurality of images 308.

In some illustrative embodiments, all or just portions of headlight management system 400 may be included in the vehicle having the headlights managed by headlight management system 400. For example, in some illustrative embodiments plurality of images 416 may be stored in a storage device in the vehicle. In other embodiments, only first number of vectors 426 and second number of vectors 428 are stored in a storage device in the vehicle. The images in plurality of images 416 may be stored remotely. In yet other embodiments, processing system 401 may be the only component in headlight management system 400 located on the vehicle.

Figure 5:
FIG. 5 is an illustration of an image of an area in front of a vehicle in accordance with an illustrative embodiment.

With reference now to FIG. 5, an illustration of an image of an area in front of a vehicle is depicted in accordance with an illustrative embodiment. Image 500 is an example of one embodiment of image 216 in FIG. 2. Image 500 is an example of one embodiment of first image 314 in FIG. 3. Image 500 is an image of area 502 in front of a vehicle. Image 500 is generated using a camera, such as camera 220 in FIG. 2, for example.

In this illustrative example, image 500 has grid 502 overlain on image 500. Grid 502 is a 16 by 12 grid. Grid 502 has 192 blocks. Values for illuminance for each pixel in each block can be averaged to produce 192 values for illuminance. Additionally, average values for red, green, and blue for pixels in each block can be identified. Three values for each of the 192 blocks results in 576 values for image 500. Thus, a total of 768 features are identified in image 500. The values for the 768 features can be included in the vector for image 500. The total number of features can also be factored down to produce a lower number of dimensions for the vector of image 500.

The illustration of image 500 is not meant to imply physical or architectural limitations to the manner in which different illustrative embodiments may be implemented. For, example the values for grid 502 and number of blocks are for illustrative purposes. Any number of blocks and features may be identified in image 500.

Figure 6:
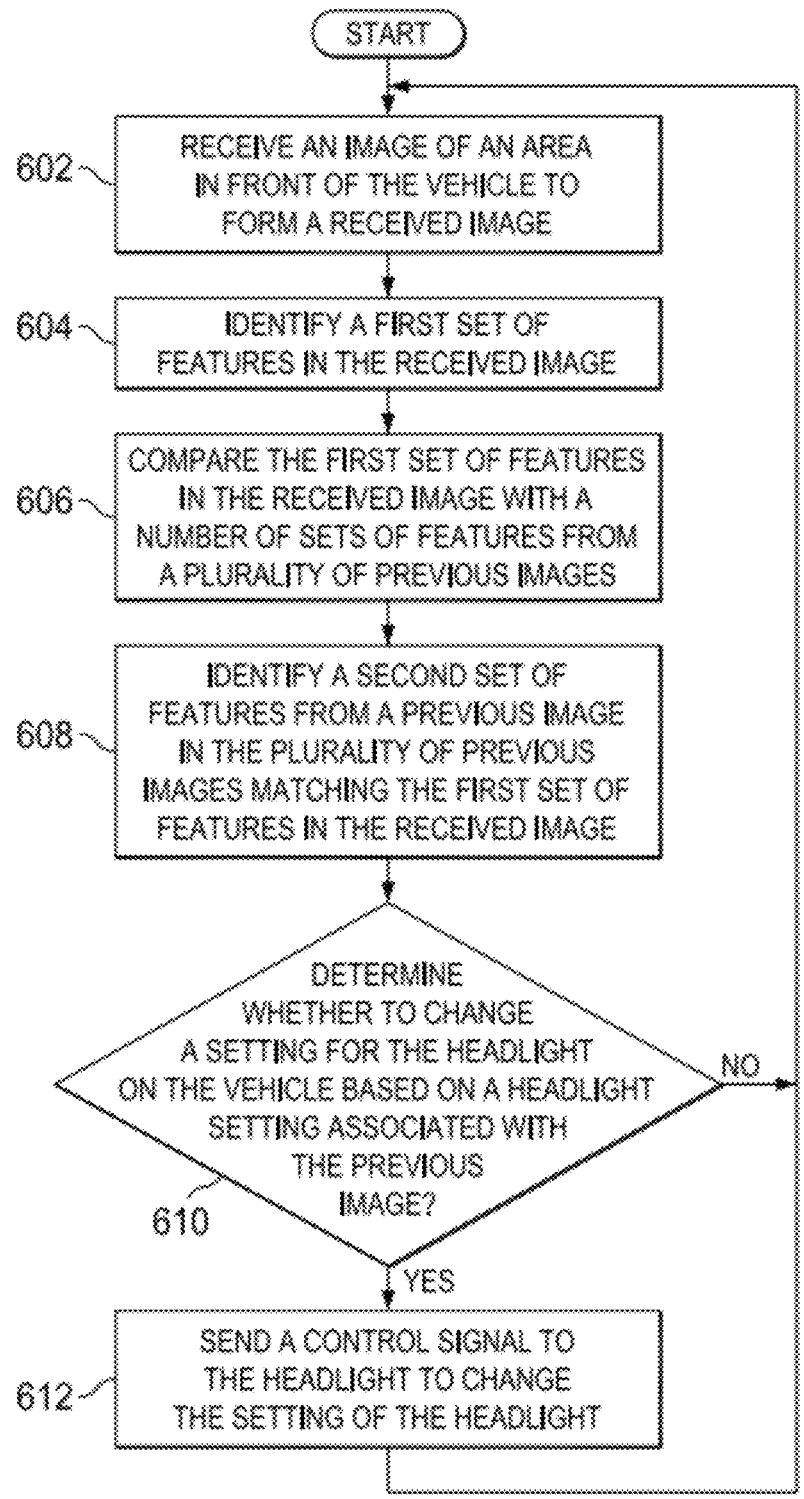
FIG. 6 is a flowchart of a process for managing a headlight on a vehicle in accordance with an illustrative embodiment.

With reference now to FIG. 6, an illustration of a flowchart of a process for managing a headlight on a vehicle is depicted in accordance with an illustrative embodiment. The process illustrated in FIG. 6 may be implemented by headlight management system 106 in vehicle 102 in FIG. 1. The process also may be implemented in processing system 401 in FIG. 4.

The process begins by receiving an image of an area in front of the vehicle to form a received image (step 602). The process then identifies a first set of features in the received image (step 604). In step 604, the set of features is identified by identifying values for amount of light and values for color at a plurality of points in the received image. Thereafter, the process compares the first set of features in the received image with a number of sets of features from a plurality of previous images (step 606). In step 606, the plurality or previous images is obtained from a training environment, such as training environment 300 in FIG. 3. Each image in the plurality of previous images has a set of features in the number of features.

The process then identifies a second set of features from a previous image in the plurality of previous images matching the first set of features in the received image (step 608). In step 608, the second set of features matches the first set of features by calculating the distance between a vector for the first set of features and the second set of features. A distance having a desired value will result in a match. Thereafter, the process determines whether to change a setting for the headlight on the vehicle based on a headlight setting associated with the previous image (step 610). If the process determines to change the setting, the process sends a control signal to the headlight to change the setting of the headlight (step 612). The process then returns to step 602 and receives another image of an area in front of the vehicle. If the process determines to not to change the setting, the process returns to step 602 and receives another image of an area in front of the vehicle.

Figure 7:
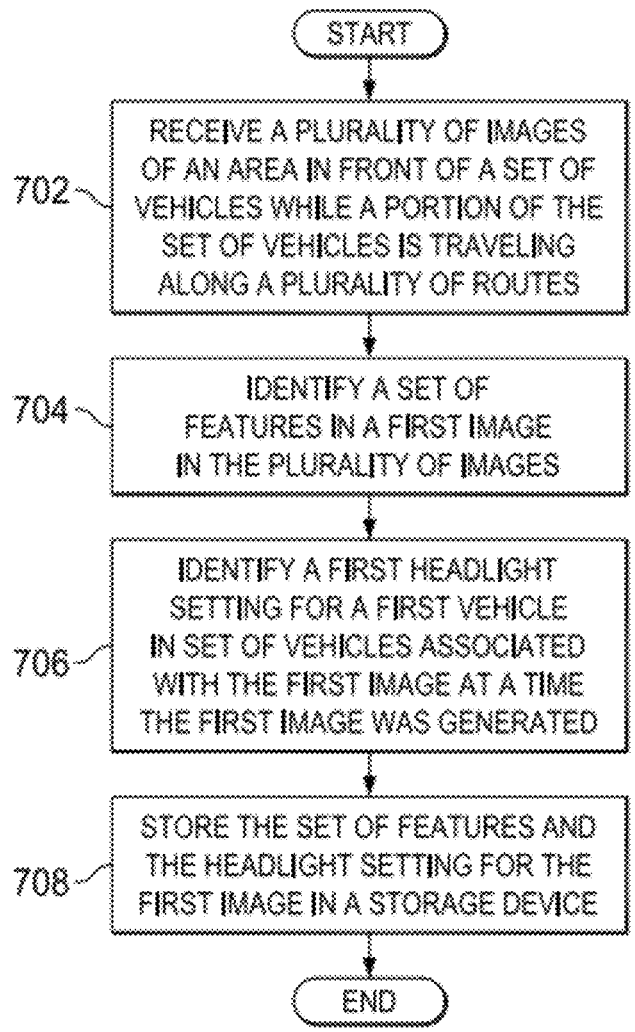
FIG. 7 is a flowchart of a process for identifying information in an image in accordance with an illustrative embodiment.

With reference now to FIG. 7, an illustration of a flowchart of a process for managing a headlight on a vehicle is depicted in accordance with an illustrative embodiment. The process illustrated in FIG. 7 may be implemented image classification system 312 in training environment 300 in FIG. 3.

The process begins by receiving a plurality of images of an area in front of a set of vehicles while a portion of the set of vehicles is traveling along a plurality of routes (step 702). The process then identifies a set of features in a first image in the plurality of images (step 704). In step 704, the set of features is identified by identifying values for amount of light and values for color at a plurality of points in the first image. The values are included in a vector of set of features for the image. In step 704, a set of features may be identified for each image in plurality of images.

Thereafter, the process identifies a first headlight setting for a first vehicle in set of vehicles associated with the first image at a time the first image was generated (step 706). In step 706, a headlight setting may be identified for each image in the plurality of images. The process then stores the set of features and the headlight setting for the first image in a storage device (step 708), with the process terminating thereafter. In step 708, the information about the first image is used in determining whether to change a headlight setting in process for managing a headlight of a vehicle, such as described above in FIG. 6.

Figure 8:
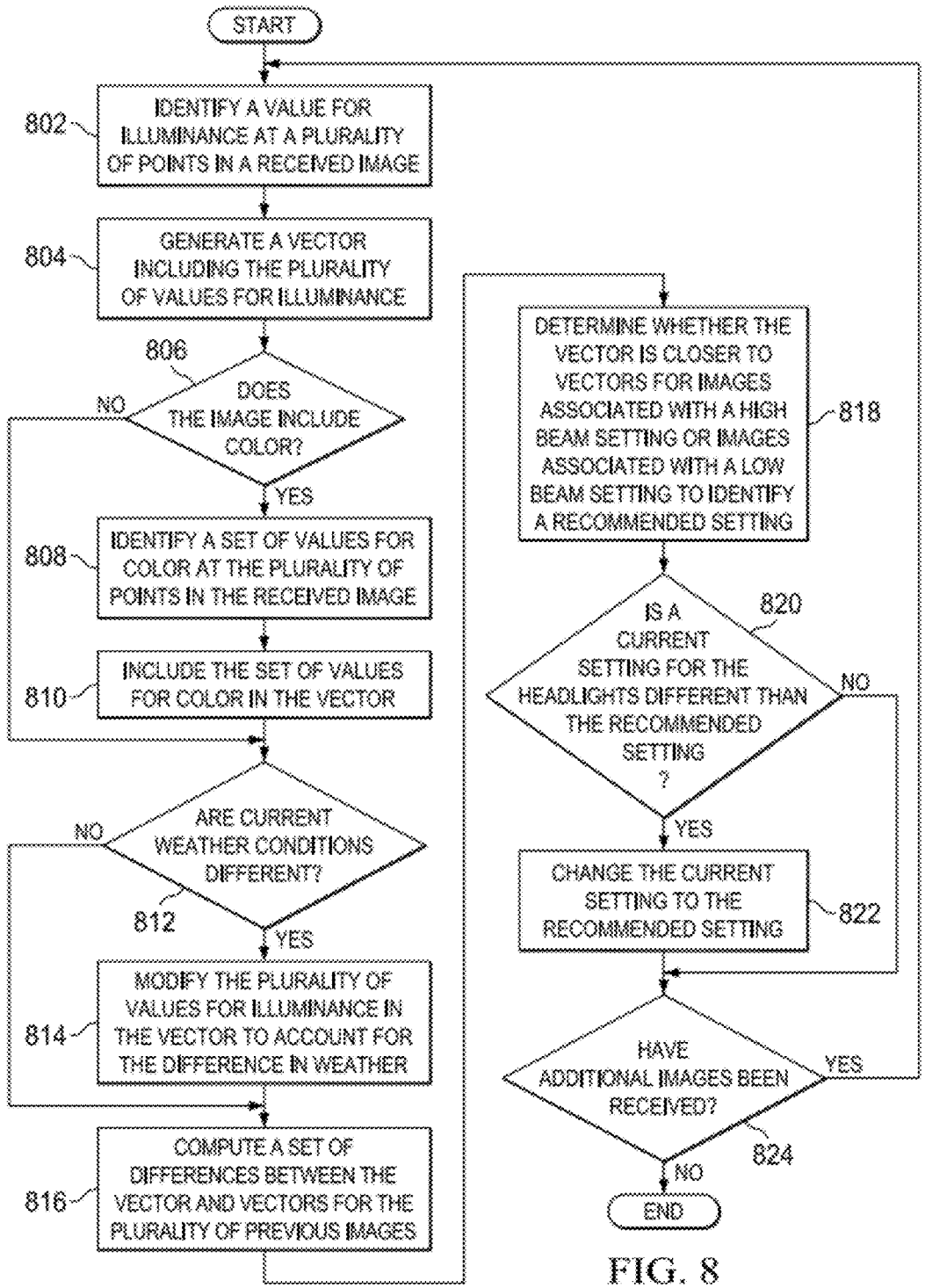
FIG. 8 is a flowchart of a process for managing a headlight on a vehicle in accordance with an illustrative embodiment.

With reference now to FIG. 8, an illustration of a flowchart of a process for managing a headlight on a vehicle is depicted in accordance with an illustrative embodiment. The process illustrated in FIG. 8 may be implemented by headlight management system 202 in headlight management environment 200 in FIG. 2. The process also may be implemented in processing system 401 in FIG. 4.

The process begins by identifying a value for illuminance at a plurality of points in a received image (step 802). The process then generates a vector including the plurality of values for illuminance (step 804). Thereafter, the process determines whether the image includes color (step 806). If the process determines that the image includes color, the process identifies a set of values for color at the plurality of points in the received image (step 808). Thereafter, the process includes the set of values for color in the vector (step 810).

If the process determines that the image does not include color, the process then determines whether current weather conditions are different (step 812). In step 812, the weather conditions occurring when the received image was generated are compared with a type of weather indicated in a portion of a plurality of previous images. If the process determines that the current weather conditions are different, the process modifies the plurality of values for illuminance in the vector to account for the difference in weather (step 814). If the process determines that the current weather conditions are not different, the process then computes a set of differences between the vector and vectors for the plurality of previous images (step 816). Thereafter, the process determines whether the vector is closer to vectors for images associated with a high beam setting or images associated with a low beam setting to identify a recommended setting (step 818).

The process then determines whether a current setting for the headlights is different than the recommended setting (step 820). In step 820, the recommended setting is the setting associated with the vectors determined to be closer to the vector for the received image. For example, the recommended setting may be a high beams setting, a low beam setting, a daytime running lamp setting, a fog lamp setting, or a driving lamp setting. If the process determines that the current setting for the headlights is different than the recommended setting, the process changes the current setting to the recommended setting (step 822). If the process determines that the current setting for the headlights is different than the recommended setting, the process determines whether additional images have been received (step 824). If the process determines that additional images have been received, the process returns to step 802 and identifies a value for illuminance at a plurality of points in the received image. If the process determines that additional images have not been received, the process terminates.

The flowchart and block diagrams in the Figures illustrate the architecture, functionality, and operation of possible implementations of systems, methods and computer program products according to various illustrative embodiments. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Turning now to FIG. 9, an illustration of a block diagram of a data processing system is depicted in accordance with an illustrative embodiment. In this illustrative example, data processing system 900 includes communications fabric 902, which provides communications between processor unit 904, memory 906, persistent storage 908, communications unit 910, input/output (I/O) unit 912, and display 914. In these illustrative examples, data processing system 900 is an example of one implementation of headlight management system 202 in FIG. 2. Data processing system 900 is also one example of processing system 401 in FIG. 4.

Processor unit 904 serves to process instructions for software that may be loaded into memory 906. Processor unit 904 may be a number of processors, a multi-processor core, or some other type of processor, depending on the particular implementation. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for processing by processor unit 904. The processes of the different embodiments may be performed by processor unit 904 using computer implemented instructions, which may be located in a memory, such as memory 906.

These instructions are referred to as program code, computer usable program code, or computer readable program code that may be read and processed by a processor in processor unit 904. The program code in the different embodiments may be embodied on different physical or tangible computer readable media, such as memory 906 or persistent storage 908.

Program code 918 is located in a functional form on computer readable media 920 that is selectively removable and may be loaded onto or transferred to data processing system 900 for processing by processor unit 904. Program code 918 and computer readable media 920 form computer program product 922 in these examples. In one example, computer readable media 920 may be computer readable storage media 924 or computer readable signal media 926. Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900. In these illustrative examples, computer readable storage media 924 is a non-transitory computer readable storage medium.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

Storage devices 916 are examples of implementations of storage device 228 in FIG. 2, as well as database 338 in FIG. 3. Further, program code 918 may include program code for identifying features in an image or computing distance between vectors.

The different components illustrated for data processing system 900 are not meant to provide architectural limitations to the manner in which different embodiments may be implemented. The different illustrative embodiments may be implemented in a data processing system including components in addition to, or in place of, those illustrated for data processing system 900. Other components shown in FIG. 9 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

As another example, a storage device in data processing system 900 is any hardware apparatus that may store data. Memory 906, persistent storage 908, and computer readable media 920 are examples of storage devices in a tangible form.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 906, or a cache, such as found in an interface and memory controller hub that may be present in communications fabric 902.

As another example, a storage device in data processing system 900 is any hardware apparatus that may store data. Memory 906, persistent storage 908, and computer readable media 920 are examples of storage devices in a tangible form.

The different illustrative embodiments recognize and take into account that it may be desirable to have a system that manages the headlights settings on a vehicle. Manual changes of the headlight settings can be tedious and error prone. Additionally, errors in selection of headlight settings can cause issues for other drivers and may result in violations of regulations.

The different illustrative embodiments identify features in images and compare the features with features identified in previous images. The features of the image are considered as a whole. The features of the image are compared with previous images associated with high beam settings and low beam settings. By separating the previous images into high beam settings and low beam settings, the different illustrative embodiments are able to identify a proper setting for the headlights of the vehicle.

Rather than having to individually classify each light source in the image, the different illustrative embodiments utilize previous images and headlight settings associated with those previous images. By utilizing previous images, an amount of time identifying details in the image of the area in front of the vehicle is reduced. Additionally, by using selections of headlight settings from previous images, real life decision making is relied upon rather than decisions based on individual light source classification.

Thus, the illustrative embodiments provide a computer implemented method, data processing system, and computer program product for managing a headlight on a vehicle. An image of an area in front of the vehicle is received. A first set of features is identified in the received image. The first set of features in the received image is compared with a number of sets of features from a plurality of previous images. Each image in the plurality of previous images is associated with a headlight setting. A second set of features from a previous image in the plurality of previous images matching the first set of features in the received image is identified. A determination is made whether to change a setting for the headlight on the vehicle based on the headlight setting associated with the previous image.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing a headlight on a vehicle, the method comprising:

receiving an image of an area in front of the vehicle to form a received image;

identifying a first set of features in the received image;

comparing the first set of features in the received image with a number of sets of features from a plurality of previous images, wherein each image in the plurality of previous images is associated with a headlight setting;

identifying a second set of features from a previous image in the plurality of previous images matching the first set of features in the received image; and determining whether to change a setting for the headlight on the vehicle based on the headlight setting associated with the previous image, wherein the plurality of previous images comprises a first set of images associated with a high beam setting as the headlight setting and a second set of images associated with a low beam setting as the headlight setting and wherein identifying the second set of features from the previous image in the plurality of previous images matching the first set of features in the received image comprises:

determining whether the first set of features in the received image is closer to sets of features from one of the first set of images and the second set of images.

2. The method of claim 1, wherein determining whether to change the setting for the headlight on the vehicle comprises:
comparing the headlight setting associated with the previous image with the setting for the headlight on the vehicle; and further comprising:
responsive to identifying a difference between the headlight setting associated with the previous image and the setting for the headlight on the vehicle, changing the setting for the headlight on the vehicle to match the headlight setting associated with the previous image.

3. The method of claim 1, wherein determining whether to change the setting for the headlight on the vehicle comprises:
determining whether to change the setting for the headlight on the vehicle to one of a high beam setting and a low beam setting.

4. The method of claim 1, wherein determining whether the first set of features in the received image is closer to sets of features from one of the first set of images and the second set of images comprises:
computing a first set of distances between a vector including values for the first set of features in the received image and a first number of vectors including values from sets of features from the first set of images and a second set of distances between the vector and a second number of vectors including values from sets of features from the second set of images; and
identifying the previous image to be used in determining whether to change the setting for the headlight on the vehicle based on a desired value for distance between the vector and one of the first number of vectors and the second number of vectors.

5. The method of claim 1, wherein identifying the first set of features in the received image comprises:
identifying a value for illuminance at a plurality of points in the received image to form a plurality of values for illuminance; and
generating a vector for the first set of features, the vector including the plurality of values for illuminance.

6. The method of claim 5 further comprising:
identifying a set of values for color at the plurality of points in the received image to form a plurality of values for color; and
including the plurality of values for color in the vector for the first set of features.

7. The method of claim 5 further comprising:
identifying weather conditions occurring in an area outside the vehicle and a type of weather associated with a portion of the plurality of previous images; and
responsive to determining a difference in weather between the weather conditions and the type of weather associated with the portion of the plurality of previous images, modifying the plurality of values for illuminance in the vector to account for the difference in weather.

8. The method of claim 1 further comprising:
storing information about the plurality of previous images in a storage device operably connected to the vehicle, wherein a first image in the of the plurality of previous images is an image of an area in front of another vehicle and wherein the information about the first image includes a headlight setting of headlights of the other vehicle at a time the first image was generated.

9. The method of claim 1 further comprising:
capturing the image by a camera located on the vehicle.

10. An apparatus comprising:
a camera located on a vehicle and configured to capture an image of an area in front of the vehicle;
a storage device storing information about a plurality of previous images, wherein each image in the plurality of previous images is associated with a headlight setting; and
a headlight management system operably connected to the storage device, the headlight management system configured to receive the image from the camera to form a received image, identify a first set of features in the received image, compare the first set of features in the received image with a number of sets of features from the plurality of previous images, identify a second set of features from a previous image in the plurality of previous images matching the first set of features in the received image, and determine whether to change a setting for a headlight on the vehicle based on the headlight setting associated with the previous image,
wherein the plurality of previous images comprises a first set of images associated with a high beam setting as the headlight setting and a second set of images associated with a low beam setting as the headlight setting and wherein identifying the second set of features from the previous image in the plurality of previous images matching the first set of features in the received image comprises:
determining whether the first set of features in the received image is closer to sets of features from one of the first set of images and the second set of images.

11. The apparatus of claim 10, wherein in determining whether to change the setting for the headlight on the vehicle the headlight management system is configured to compare the headlight setting associated with the previous image with the setting for the headlight on the vehicle and change the setting for the headlight on the vehicle to one of a high beam setting and a low beam setting to match the headlight setting associated with the previous image in response to identifying a difference between the headlight setting associated with the previous image and the setting for the headlight on the vehicle.

12. The apparatus of claim 10, wherein in identifying the first set of features in the received image the headlight management system is configured to identify a value for illuminance at a plurality of points in the received image to form a plurality of values for illuminance, and generate a vector for the first set of features, the vector including the plurality of values for illuminance.

13. The apparatus of claim 12 further comprising:
a weather sensor connected to the vehicle and configured to identify weather conditions occurring in an area outside the vehicle; and
wherein the headlight management system is further configured to identify a type of weather associated with a portion of the plurality of previous images and modify the plurality of values for illuminance in the vector to account for a difference in weather in response to determining a difference in weather between the weather conditions and the type of weather associated with a portion of the plurality of previous images.

14. A computer program product for managing a headlight on a vehicle, the computer program product comprising:
a computer readable tangible storage device;
program code, stored on the computer readable tangible storage device, configured to receive an image of an area in front of the vehicle to form a received image;

program code, stored on the computer readable tangible storage device, configured to identify a first set of features in the received image;
program code, stored on the computer readable tangible storage device, configured to compare the first set of features in the received image with a number of sets of features from a plurality of previous images, wherein each image in the plurality of previous images is associated with a headlight setting;
program code, stored on the computer readable tangible storage device, configured to identify a second set of features from a previous image in the plurality of previous images matching the first set of features in the received image; and
program code, stored on the computer readable tangible storage device, configured to determine whether to change a setting for the headlight on the vehicle based on the headlight setting associated with the previous image, wherein the plurality of previous images comprises a first set of images associated with a high beam setting as the headlight setting and a second set of images associated with a low beam setting as the headlight setting and wherein the program code configured to identify the second set of features from the previous image in the plurality of previous images matching the first set of features in the received image comprises:
program code, stored on the computer readable tangible storage device, configured to determine whether the first set of features in the received image is closer to sets of features from one of the first set of images and the second set of images.

15. The computer program product of claim 14, wherein the program code configured to determine whether to change the setting for the headlight on the vehicle comprises:
program code, stored on the computer readable tangible storage device, configured to compare the headlight setting associated with the previous image with the setting for the headlight on the vehicle; and further comprising:
program code, stored on the computer readable tangible storage device, configured to change, responsive to identifying a difference between the headlight setting associated with the previous image and the setting for the headlight on the vehicle, the setting for the headlight on the vehicle to match the headlight setting associated with the previous image.

16. The computer program product of claim 14, wherein the program code configured to determine whether the first set of features in the received image is closer to sets of features from one of the first set of images and the second set of images comprises:
program code, stored on the computer readable tangible storage device, configured to compute a first set of distances between a vector including values for the first set of features in the received image and a first number of vectors including values from sets of features from the first set of images and a second set of distances between the vector and a second number of vectors including values from sets of features from the second set of images; and
program code, stored on the computer readable tangible storage device, configured to identify the previous image to be used in determining whether to change the setting for the headlight on the vehicle based on a desired value for distance between the vector and one of the first number of vectors and the second number of vectors.

17. The computer program product of claim 14, wherein the program code configured to identify the first set of features in the received image comprises:
program code, stored on the computer readable tangible storage device, configured to identify a value for illuminance at a plurality of points in the received image to form a plurality of values for illuminance;
program code, stored on the computer readable tangible storage device, configured to generate a vector for the first set of features, the vector including the plurality of values for illuminance,
program code, stored on the computer readable tangible storage device, configured to identify a set of values for color at the plurality of points in the received image to form a plurality of values for color; and
program code, stored on the computer readable tangible storage device, configured to include the plurality of values for color in the vector for the first set of features.

18. The computer program product of claim 14 further comprising:
program code, stored on the computer readable tangible storage device, configured to store information about the plurality of previous images in a storage device operably connected to the vehicle, wherein a first image in the of the plurality of previous images is an image of an area in front of another vehicle and wherein the information about the first image includes a headlight setting of headlights of the other vehicle at a time the first image was generated.

19. A method for identifying information in an image, the method comprising:
receiving a plurality of images of an area in front of a set of vehicles while a portion of the set of vehicles is traveling along a plurality of routes;
identifying a set of features in a first image in the plurality of images;
identifying a first headlight setting for a first vehicle in the set of vehicles associated with the first image at a time the first image was generated; and
storing the set of features and the first headlight setting for the first image in a storage device, wherein the set of features and the headlight setting are used in determining whether to change a setting associated with a headlight of another vehicle,
wherein the plurality of previous images comprises a first set of images associated with a high beam setting as the headlight setting and a second set of images associated with a low beam setting as the headlight setting and wherein identifying the second set of features from the previous image in the plurality of previous images matching the first set of features in the received image comprises:
determining whether the first set of features in the received image is closer to sets of features from one of the first set of images and the second set of images.

20. The method of claim 19 further comprising:
identifying a headlight setting associated with each of the plurality of images; and
separating the plurality of images into a first set of images associated with a high beam setting as the headlight setting and a second set of images associated with a low beam setting as the headlight setting.

21. The method of claim 19, wherein identifying the set of features in the first image in the plurality of images comprises:

identifying a value for illuminance at a plurality of points in the first image to form a plurality of values for illuminance; and generating a vector for the set of features, the vector including the plurality of values for illuminance; and further comprising:

storing the vector for the set of features in association with the set of features and the headlight setting for the first image in the storage device.

22. The method of claim 21 further comprising:

identifying a set of values for color at the plurality of points in the first image to form a plurality of values for color; and including the plurality of values for color in the vector for the set of features.

23. The method of claim 21 further comprising:

identifying a type of weather occurring in an area outside the first vehicle at the time the first image was generated; and storing information about the type of weather in association with the set of features, the headlight setting, and the vector for the first image in the storage device.

\* \* \* \* \*